United States Patent
Birkenholz et al.

(10) Patent No.: US 9,522,575 B2
(45) Date of Patent: Dec. 20, 2016

(54) AGRICULTURAL BAR NOSE TO PREVENT STUBBLE DAMAGE

(75) Inventors: Wayne Birkenholz, Ankeny, IA (US); Bradley J. Harris, New London, OH (US); Benjamin Robert Rethmel, Doylestown, OH (US); Todd A. Buxton, Norton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1292 days.

(21) Appl. No.: 13/400,881

(22) Filed: Feb. 21, 2012

(65) Prior Publication Data

US 2013/0213541 A1 Aug. 22, 2013

(51) Int. Cl.
*B60C 11/11* (2006.01)
*B60C 11/03* (2006.01)

(52) U.S. Cl.
CPC ........ *B60C 11/0311* (2013.04); *B60C 11/0316* (2013.04); *B60C 2011/0313* (2013.04)

(58) Field of Classification Search
CPC ............ B60C 11/0311; B60C 11/0316; B60C 2011/0313
See application file for complete search history.

(56) References Cited

U.S. PATENT DOCUMENTS

| | | |
|---|---|---|
| 4,186,788 A | 2/1980 | Pommier |
| 4,446,902 A | 5/1984 | Madec et al. |
| 4,480,672 A | 11/1984 | Marshall et al. |
| 5,010,935 A | 4/1991 | Bonko et al. |
| 5,337,814 A | 8/1994 | Bonko |
| 5,337,816 A | 8/1994 | Bonko et al. |
| 5,609,699 A | 3/1997 | Himuro |
| 5,733,394 A | 3/1998 | Baus et al. |
| 6,062,282 A | 5/2000 | Bonko |
| 6,179,027 B1 | 1/2001 | Shimizu |
| 6,209,602 B1 | 4/2001 | Bonko |
| 6,260,594 B1 | 7/2001 | Bonko et al. |
| 6,263,933 B1 | 7/2001 | Baus |
| 7,762,296 B2 | 7/2010 | Ganz et al. |
| 2004/0099359 A1 | 5/2004 | Bonko |
| 2004/0118497 A1* | 6/2004 | Bonko ................ B60C 11/0311 152/209.12 |
| 2008/0142134 A1 | 6/2008 | Tedesco |

(Continued)

FOREIGN PATENT DOCUMENTS

| | | |
|---|---|---|
| JP | 58047607 A | 3/1983 |
| JP | 8034210 A | 2/1996 |

(Continued)

OTHER PUBLICATIONS

Machine translation for Japan 10-338007 (no date).*

(Continued)

*Primary Examiner* — Steven D Maki

(57) ABSTRACT

A pneumatic agricultural tire includes first and second rows of angled lugs. Each lug is provided with a leading wall rising up from a tread floor to a leading edge of the lug surface. The leading wall has a wedge shaped leading nose rising up from the tread floor and sloped in the trailing direction so that ground stubble is engaged by and pushed aside by the wedge shaped leading nose thereby reducing stubble damage at a root of the leading wall.

20 Claims, 10 Drawing Sheets

(56) References Cited

U.S. PATENT DOCUMENTS

2009/0084478 A1\* 4/2009 Wallet ................ B60C 11/0311
      152/209.13
2010/0243118 A1  9/2010 Bonko et al.
2013/0213541 A1  8/2013 Birkenholz et al.

FOREIGN PATENT DOCUMENTS

| JP | 8085309 A | 4/1996 |
| JP | EP-795427 A1 \* | 9/1997 |
| JP | H09323508 A | 12/1997 |
| JP | 10-338007 A \* | 12/1998 |
| JP | 3319977 B2 | 9/2002 |
| JP | 2002347412 A | 12/2002 |
| JP | 2003205709 A | 7/2003 |
| JP | 2015509881 A | 4/2015 |
| KR | 10-2004-0027038 A | 4/2004 |

OTHER PUBLICATIONS

Park, Jin Ho; International Search Report and Written Opinion; May 27, 2013; pp. 1-14; Korean Intellectual Property Office; Daejeon Metropolitan City, Republic of Korea.
English translation of Aug. 25, 2015 office action in corresponding Japan App. 2014-556765, 4 pp. (not prior art).
European Search Report in corresponding European Patent Application No. EP 13752505, dated Nov. 13, 2015, 7 pp. (not prior art).
China Notification of the First Office Action (PCT Application in the National Phase) in Chinese Application for Invention No. 201380010092.5, dated Jan. 26, 2016, 2 pp. (not prior art).

\* cited by examiner

AGRICULTURAL BAR NOSE TO PREVENT STUBBLE DAMAGE

BACKGROUND OF THE INVENTION

1. Field of the Invention

The present invention relates generally to agricultural tires, and more particularly, but not by way of limitation, to tires for use in grain fields or the like where the tires are sometimes damaged by engagement with sharp stubbles of grain which has been cut.

2. Description of the Prior Art

FIG. 1 shows a typical prior art agricultural tire 10 having first and second rows of tread lugs such as 12 and 14. Each of the tread lugs has a leading edge with a straight nose edge portion such as 16.

FIG. 2 is an enlarged view of the lug 12 of FIG. 1 and further identifies the straight nose edge 16. A nose wall 18 extends downward from the nose edge 16 to a tread floor 20. The nose wall 18 is typically at a very shallow angle 22 in the range of from 0° to 18° to a radial line 24 extending from the rotational axis of the tire 10.

The nose wall 18 and nose edge 16 are the first portions of the lug 12 to engage the ground in use of the tire as it rolls in a forward direction. The prior art tire 10 is prone to encountering damage at the base of the nose wall 18. FIG. 3 is a photograph of a prior art tire like the tire 10 illustrating such damage at the base of the nose wall of two lugs.

FIG. 4 is an enlarged view of the uppermost portion of FIG. 3 further illustrating the damage to the lower portion of the nose wall of the lug.

There is a continuing need in the art for improved lug designs to minimize damage such as that illustrated in FIGS. 3 and 4.

SUMMARY OF THE INVENTION

In a first embodiment a pneumatic agricultural tire includes a circumferential tread portion including first and second rows of tread lugs extending from first and second shoulders of the tread portion toward an equatorial plane of the tire. The tread lugs extend upward from a tread floor by a lug height. The lugs extend at an angle to a rotational axis of the tire to define a rotational direction of the tire such that when the tire is rolling in a forward direction an axially inner end of each lug engages the ground before an axially outer end of the lug engages the ground. Each lug has a radially outer ground engaging surface defined between a leading edge of the lug and a trailing edge of the lug. The leading edge of each lug includes an inside leading edge facing partially toward the equatorial plane, an outside leading edge facing partially toward the respective shoulder from which the lug extends, and a nose edge joining the inside leading edge and the outside leading edge. A nose wall extends upward from the tread floor to the nose edge. The nose wall has a leading root portion having a nose ridge extending upward from the tread floor to at least one-half the tread height. The nose ridge has a radius of curvature of no greater than ½ inch. The nose ridge extends at a nose angle of from about 20° to about 60° to a radial plane.

In another aspect of the invention each lug of a pneumatic agricultural tire has a radially outer ground engaging surface defined between a leading edge of the lug and a trailing edge of the lug. The leading edge of each lug includes an inside leading edge facing partially toward the equatorial plane and an outside leading edge facing partially toward the respective shoulder from which the lug extends. Each lug has a leading wall rising up from the tread floor to the leading edge. The leading wall includes a wedge shaped leading nose rising up from the tread floor and sloped in the trailing direction, so that ground stubble is engaged by and pushed aside by the wedge shaped leading nose thereby reducing stubble damage at a root of the leading wall.

Numerous objects features and advantages of the present invention will be readily apparent to those skilled in the art upon a reading of the following disclosure when taken in conjunction with the accompanying drawings.

DETAILED DESCRIPTION OF THE INVENTION

Following are definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to directions which are parallel to the axis of rotation of a tire.

"Circumferential" refers to lines or directions extending along the perimeter of the surface of the annular tread perpendicular to the axial direction.

"Equatorial plane (EP)" refers to a plane that is perpendicular to the axis of rotation of a tire and passes through the center of the tire's tread.

"Radial" and "radially" refer to directions that are perpendicular to the axis of rotation of a tire.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Figure 1:
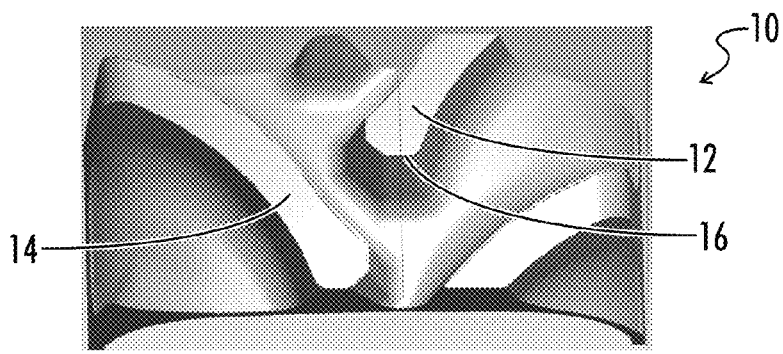
FIG. 1 is a perspective view of a prior art agricultural tire.
Figure 2:
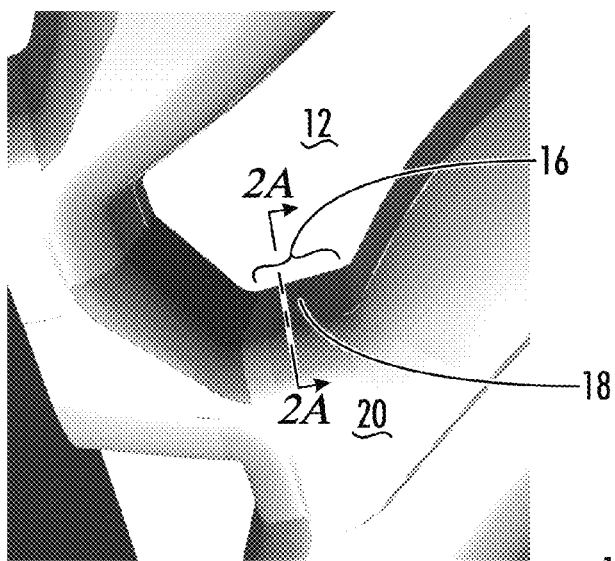
FIG. 2 is an enlarged view of the tire of FIG. 1.
Figure 2A:
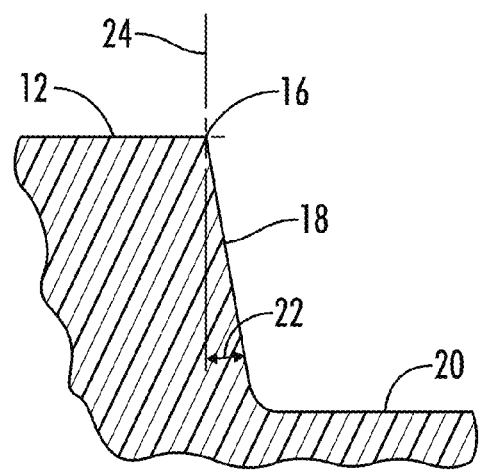
FIG. 2A is a cross-section along line 2A-2A of FIG. 2.
Figure 3:
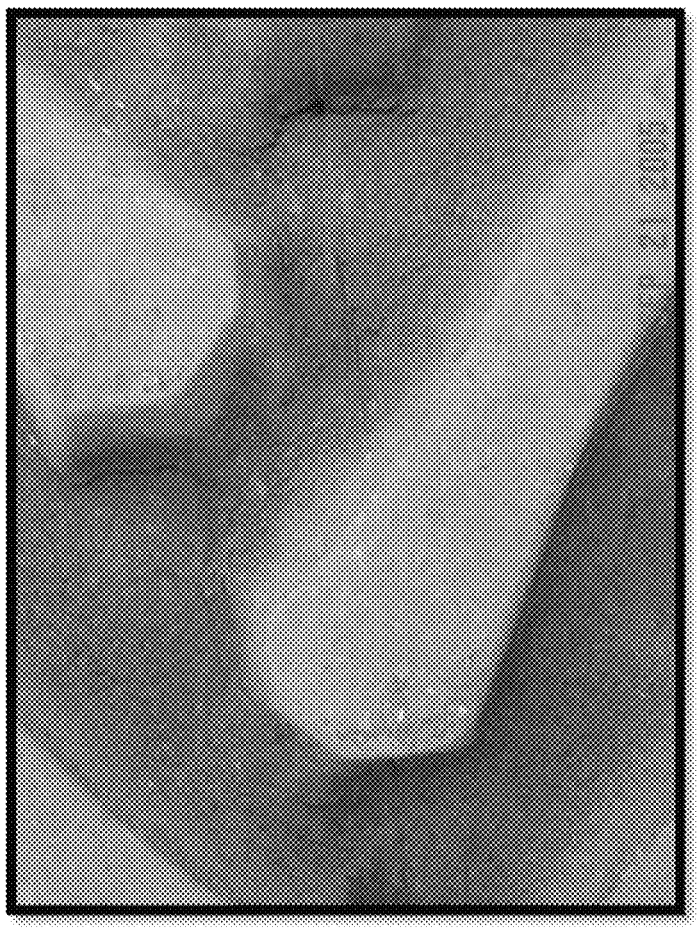
FIG. 3 is a photograph of a tire like that of FIG. 1 showing stubble damage.
Figure 4:
FIG. 4 is an enlarged photograph of the stubble damage of FIG. 3.
Figure 5:
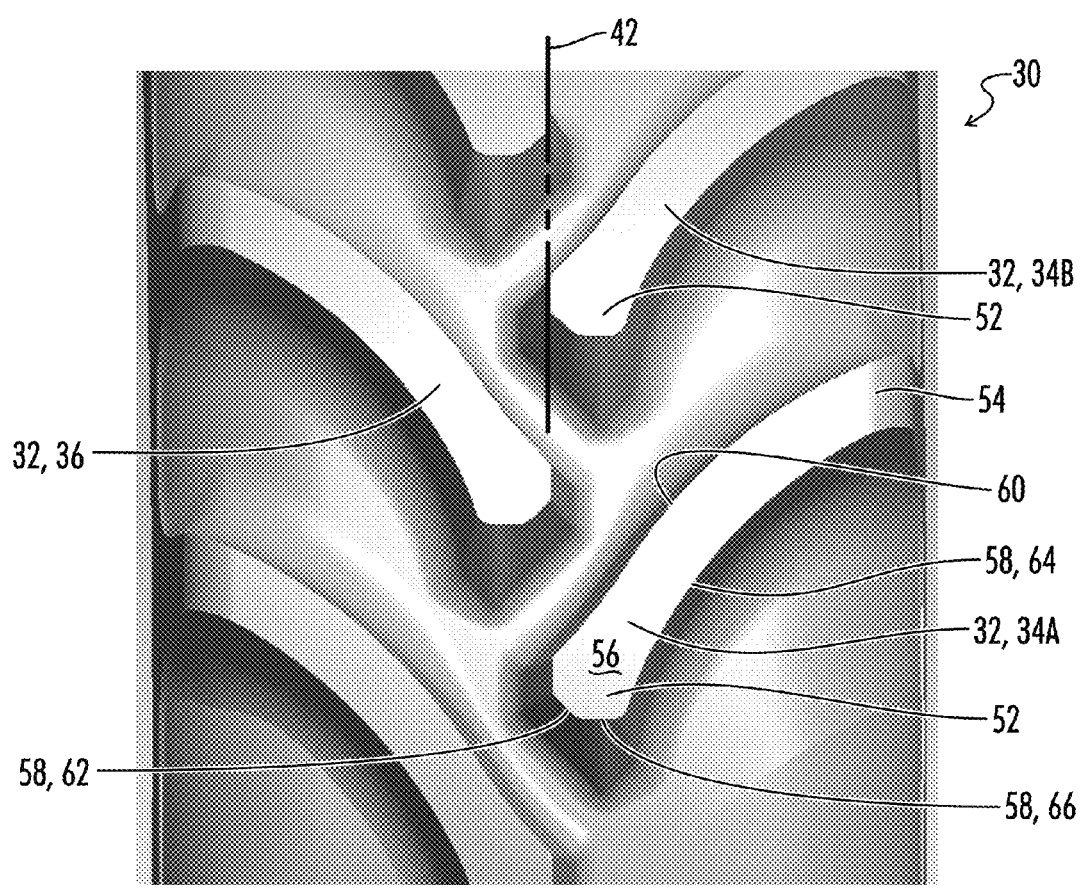
FIG. 5 is a perspective view of the tread portion of a tire incorporating a first embodiment of the lug design of the present invention.
Figure 5A:
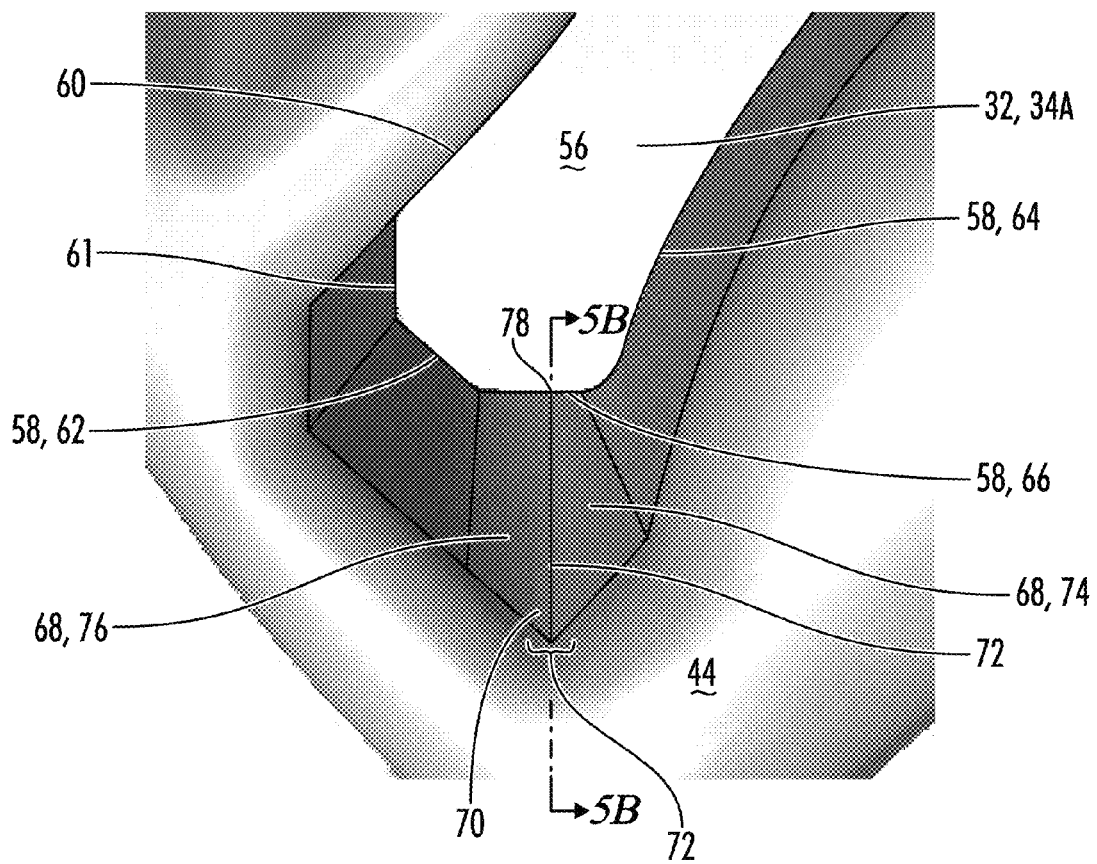
FIG. 5A is an enlarged schematic view of one of the axially inner lug ends of the tire of FIG. 5 indicating the major break lines and the outer surface of the lug wall.
Figure 5B:
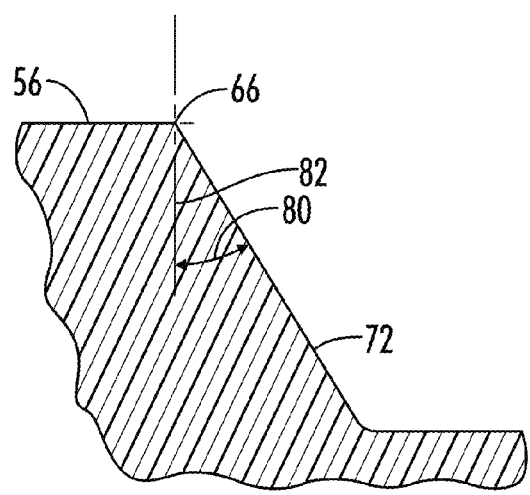
FIG. 5B is a sectioned view taken along line 5B-5B of FIG. 5A showing the nose ridge angle.

The Embodiment of FIGS. 5, 5A and 5B

Figure 8:
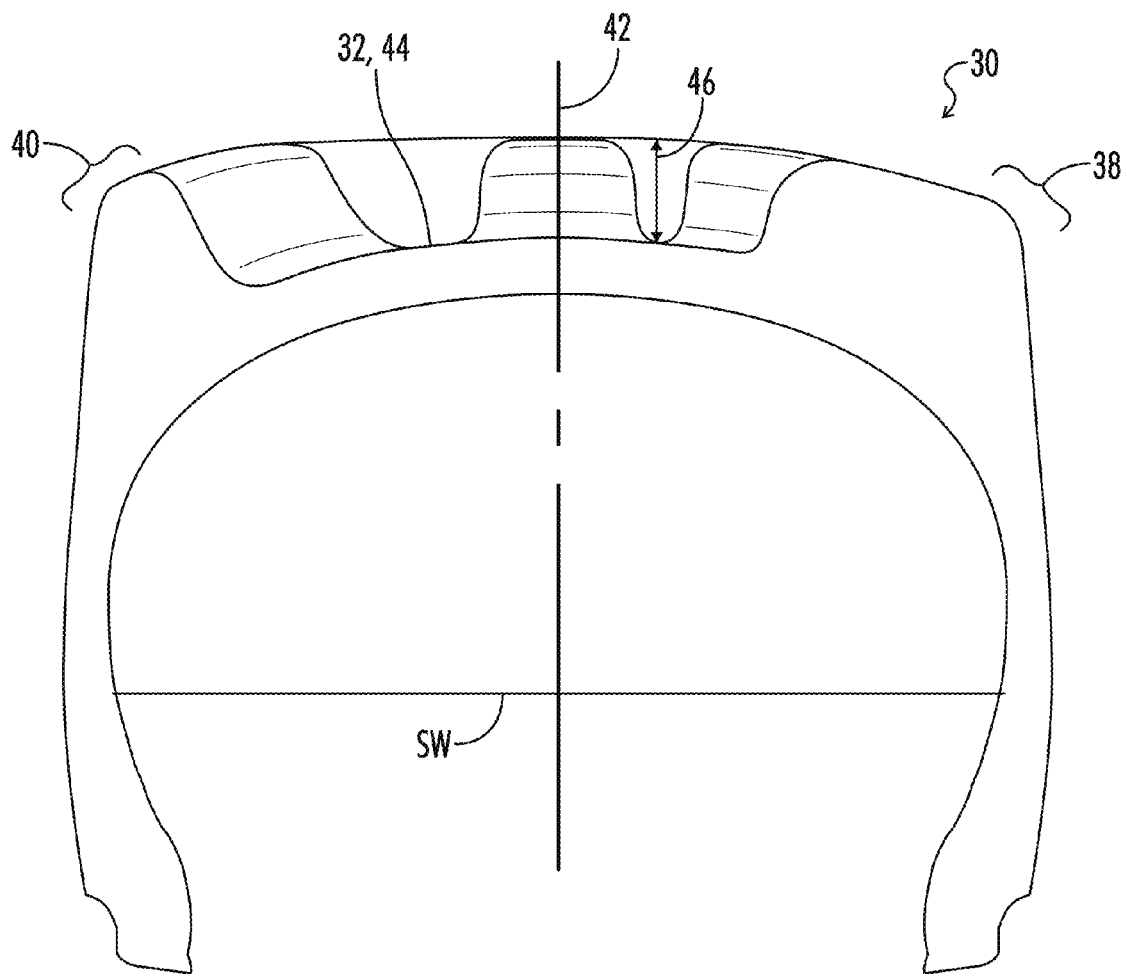
FIG. 8 is a schematic radially sectioned view of a tire like that of FIG. 5.
Figure 9:
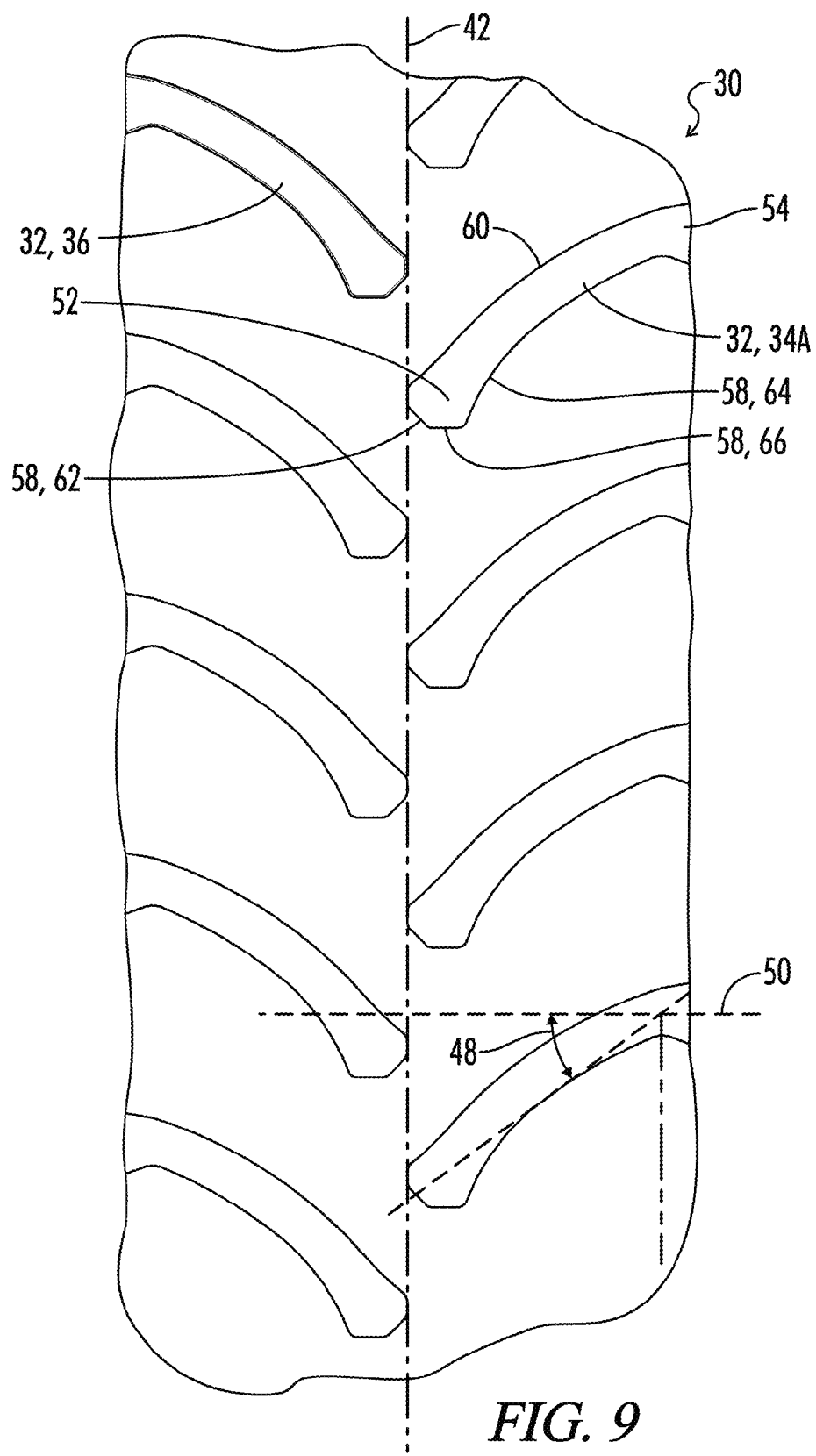
FIG. 9 is a schematic laid out view of the ground engaging surfaces of the lugs of the tread portion of the tire of FIG. 5.

Referring now to FIG. 5, a first embodiment of a pneumatic agricultural tire is shown and generally designated by the numeral 30. A radial cross-section of the tire 30 is schematically shown in FIG. 8. A laid out view of the ground engaging surface of the tire of FIG. 5 is shown in FIG. 9. Some non-limiting examples of agricultural implements which may utilize the tire design disclosed herein include tractors (both front and rear tires), self-propelled sprayers, combines, powered implements and the like.

The tire 30 includes a circumferential tread portion 32 including first and second rows of tread lugs 34 and 36 extending from first and second shoulders 38 and 40 of the tread portion toward an equatorial plane 42 of the tire. The individual lugs of the first row 34 may be identified as 34A, 34B, etc. as indicated in FIG. 5. As best seen in FIG. 8, the tread lugs 34 and 36 extend upward from a tread floor 44 by a lug height 46. Each lug 34 and 36 preferably extends substantially to but does not cross the equatorial plane 42.

As best seen in FIG. 9, the lugs extend at a lug angle 48 to a rotational axis 50 of the tire to define a rotational direction of the tire such that when the tire is rolling in a forward direction an axially inner end 52 of each lug engages the ground before an axially outer end 54 of the lug engages the ground.

Each lug has a radially outer ground engaging surface such as the surface 56 of lug 34A identified in FIG. 5, and in the enlarged view of FIG. 5A.

The radially outer ground engaging surface 56 is defined between a leading edge 58 of the lug and a trailing edge 60 of the lug. The leading edge 58 includes an inside leading edge 62 facing partially toward the equatorial plane 42, and an outside leading edge 64 facing partially toward the respective shoulder 38 from which the lug 34A extends. The leading edge 58 further includes a nose edge 66 joining the inside leading edge 62 and the outside leading edge 64. In the embodiment of FIG. 5, the nose edge 66 is a straight nose edge. As will be further discussed below, in the embodiment of FIG. 6, the nose edge is also a straight nose edge, and in the embodiment of FIG. 7, the nose edge is a curved nose edge.

The axially inner end of the radially outer surface 56 of the lug is defined by an inside lateral edge 61 extending in a substantially circumferential direction.

A nose wall 68 extends upward from the tread floor 44 to the nose edge 66. The nose wall 68 has a leading root portion 70 having a nose ridge 72 extending upward from the tread floor 44 to at least one half the tread height 46. The nose ridge 72 extends substantially perpendicular to but not radially from the rotational axis 50 of the tire.

In the embodiment of FIGS. 5 and 5A, the nose wall 68 includes first and second nose wall sides 74 and 76 extending upward from the tread floor 44 and joined at the nose ridge 72.

In the embodiment of FIGS. 5 and 5A, the first and second nose wall sides 74 and 76 extend all the way up to the straight nose edge 66 and thus the nose ridge 72 also extends all the way up to the straight nose edge 66 where the nose ridge 72 joins the nose edge 66 at an intermediate point 78 which preferably is approximately a mid-point of the straight nose edge 66.

Figure 7:
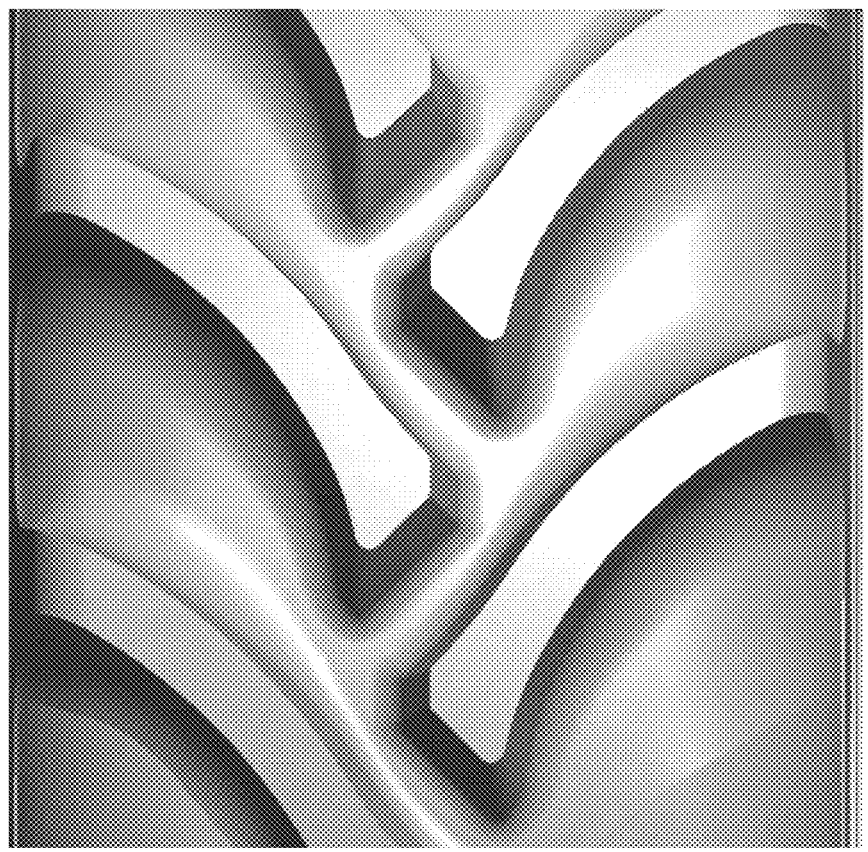
FIG. 7 is a view similar to FIG. 5 showing a third embodiment of the lug design of the present invention.

It will be appreciated with reference to FIG. 5A that although each of the nose wall sides 76 and 78 has four edges, they are not truly planar members. They are each somewhat in the shape of a twisted four sided plane. The nose wall sides 74 and 76 join together to form the nose ridge 72, the centermost line of which is designated schematically in FIG. 5A by a line, but it will be appreciated that the nose ridge 72 will always have some degree of curvature or radius. Furthermore, as is further described below with regard to the embodiment of FIG. 7, the nose ridge may in fact have a significant radius of curvature particularly if a curved nose edge 66 is utilized as shown in FIG. 7. In general, the nose ridge has a radius of curvature no greater than one-half inch. In another embodiment the nose ridge has a radius of curvature no greater than 0.3 inch.

As shown in FIG. 5B, which is a sectional view taken along line 5B-5B of FIG. 5A, the nose ridge 72 extends at a nose angle 80 which preferably is in a range of from about 20° to about 60° to a radial plane such as 82.

In another embodiment the nose angle 82 may be in a range of from about 30° to about 50°, and in still another embodiment the nose angle may be in a range of from about 35° to about 45°.

As is best seen in FIG. 9, the straight nose edge 66 extends substantially parallel to the rotational axis 50 of the tire 30.

The nose wall 68 as shown in enlarged view in FIG. 5A can also be described as a leading wall 68 rising up from the tread floor 44 to the leading edge 66. The leading wall 68 includes a wedge shaped leading nose formed by the nose side walls 74 and 76 and the wedge shaped leading nose rises up from the tread floor 44 and is sloped as is seen in FIG. 5B in the trailing direction by angle 80.

The wedge shaped leading nose formed by nose side walls 74 and 76 acts in a manner of a cow catcher or leading scoop so that ground stubble from previously cut crops which is being rolled over by the tire 30 is engaged by and pushed aside by the wedge shaped leading nose thereby reducing stubble damage at the root 70 of the leading wall 68.

The nose ridge 72 can be further described as a discernible nose ridge which extends from the tread floor 44 to at least one half the lug height 46, and in the embodiment of FIG. 5A extends all the way to the nose edge 66, thus extending the entire lug height 46.

Figure 6:
FIG. 6 is a view similar to FIG. 5 illustrating a second embodiment of the lug design of the present invention.
Figure 6A:
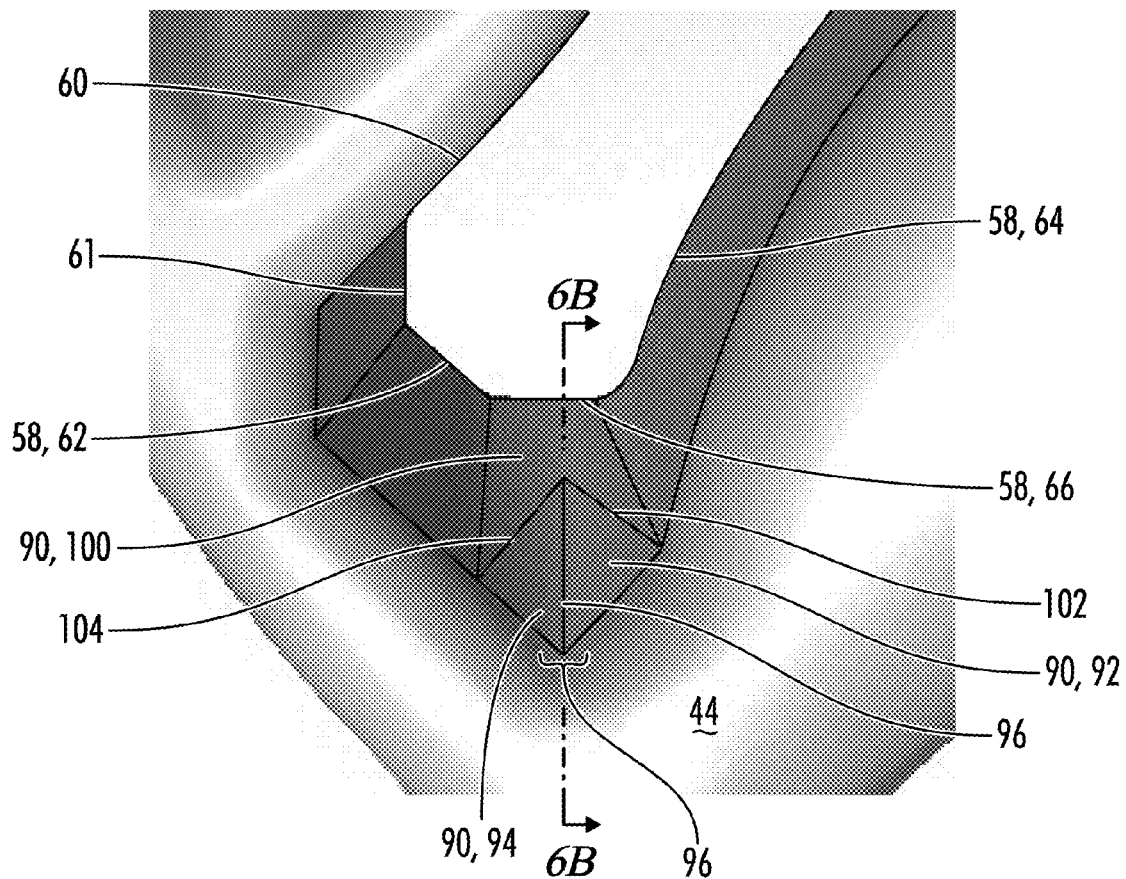
FIG. 6A is an enlarged schematic view of one of the axially inner lug ends of the tire of FIG. 6 indicating the major break lines and the outer surface of the lug wall.
Figure 6B:
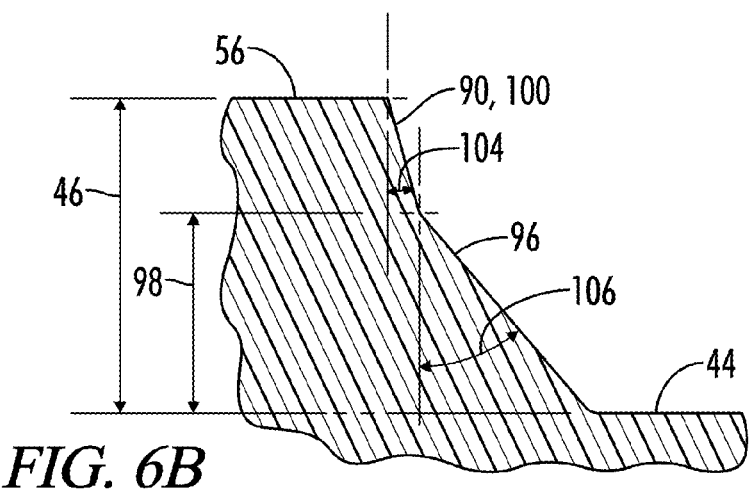
FIG. 6B is a sectioned view taken along line 6B-6B of FIG. 6A showing the nose ridge angle.

The Embodiment of FIGS. 6, 6A and 6B

Referring now to FIGS. 6, 6A and 6B, a second embodiment is described, which is similar to the embodiment of FIGS. 5, 5A and 5B, except for the shape of the nose wall. In the embodiment of FIG. 6, those features which are substantially identical to the features of the embodiment of FIG. 5 are identified with the same numerals used above with regard to FIG. 5.

The differences between the embodiments of FIGS. 5 and 6 are best understood with reference to the enlarged view of FIG. 6A. the differences lie in the shape of the nose wall and the nose wall sides.

As shown in FIG. 6A, the nose edge 66 is still a straight nose edge such as was described above with regard to FIG. 5.

A modified nose wall 90 includes first and second nose wall sides 92 and 94 which extend upward from the tread floor 44 and are joined at a nose ridge 96.

In the embodiment of FIG. 6A, instead of rising all the way to the nose edge 66, the nose wall sides 92 and 94, and the nose ridge 96 defined between them, terminate at a height 98 which is in a range of from 25% to 100% of, and more preferably from one-half to three quarters of, the lug height 46 above the tread floor 44. Then the nose wall sides 92 and 94 blend together into an upper nose surface 100 with no discernible nose ridge. The upper nose surface 100 extends to the straight nose edge 66.

Once again, it is noted that FIG. 6A is schematic, and although it indicates the location of nose ridge 96 with a line, it will be understood that the nose ridge 96 and all other break lines shown schematically in FIG. 6A all have some degree of curvature. Furthermore, the lines 102 and 104 schematically indicating the locations where the nose wall sides 92 and 94 blend into the upper nose surface 100 will also have a concave curvature.

FIG. 6B is a sectioned view along line 6B-6B of FIG. 6A and generally indicates the upper nose angle 104 for the upper nose surface 100, and the lower nose angle 106 for the nose ridge 96. In one embodiment, the upper nose angle 104 may be in a range of from about 0° to about 20°. In one embodiment the lower nose angle 106 may be in a range of from about 20° to about 60°, and more preferably in a range of from about 30° to about 50°, and most preferably in a range of from about 35° to about 45°.

Figure 7A:
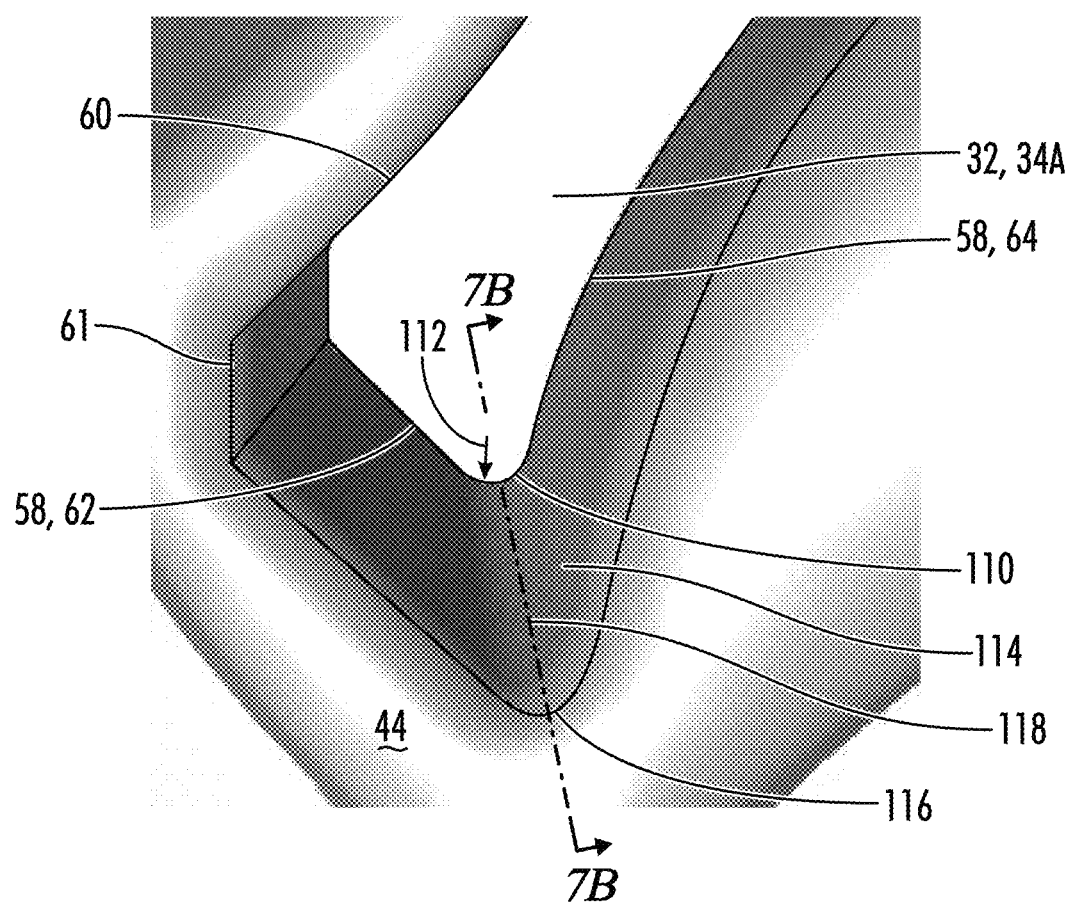
FIG. 7A is an enlarged schematic view of one of the axially inner lug ends of the tire of FIG. 7 indicating the major break lines and the outer surface of the lug wall.
Figure 7B:
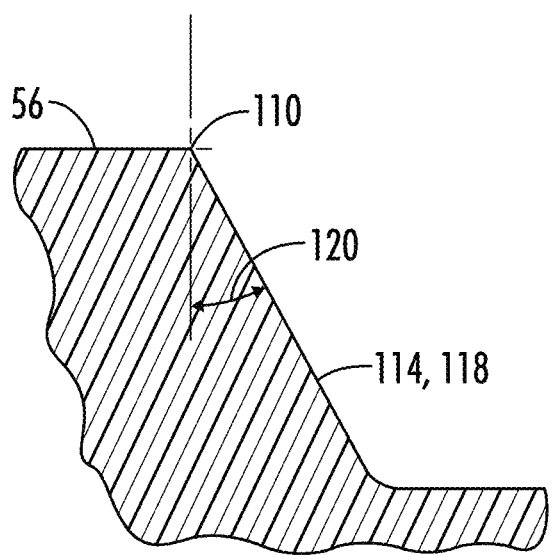
FIG. 7B is a sectioned view taken along line 7B-7B of FIG. 7A showing the nose ridge angle.

The Embodiment of FIGS. 7, 7A and 7B

The embodiment of FIGS. 7, 7A and 7B differs from the embodiment of FIG. 5 in the shape of the nose edge and the nose wall. Those features which are similar to the embodiment of FIG. 5 are indicated with the same identifying numerals used with regard to FIG. 5.

As best seen in FIG. 7A, in the embodiment of FIG. 7 the inside leading edge 62 and outside leading edge 64 are joined by a curved nose edge 110 having a radius of curvature 112 of no greater than one-half inch. In another embodiment the radius of curvature 112 is no greater than 0.3 inch. In another embodiment the radius of curvature 112 is approximately 0.24 inch.

The lug of FIG. 7A has a curved slope nose wall 114 which extends all the way downward to a curved root or base 116 generally adjacent the tread floor 44. A dashed line in FIG. 7A generally indicates the center line of a nose ridge 118 having a curvature similar to that of the curved nose edge 110 and extending from the tread floor 44 up to the curved nose edge 110.

In the cross-sectional view of FIG. 7B the nose angle 120 as shown in one embodiment is in the range of from about 20° to about 60°. In another embodiment the angle 120 is in the range of from about 30° to about 50°. In still another embodiment the angle 120 is in the range of from about 35° to about 45°.

Additional Description

Exemplary constructions for a pneumatic agricultural tire have been described. The following clauses are offered as further description of the disclosed invention.

(1) A pneumatic agricultural tire, comprising:

a circumferential tread portion including first and second rows of tread lugs extending from first and second shoulders of the tread portion toward an equatorial plane of the tire, the tread lugs extending upward from a tread floor by a lug height;

the lugs extending at an angle to a rotational axis of the tire to define a rotational direction of the tire such that when the tire is rolling in a forward direction an axially inner end of each lug engages the ground before an axially outer end of the lug engages the ground;

each lug having a radially outer ground engaging surface defined between a leading edge of the lug and a trailing edge of the lug;

the leading edge of each lug including an inside leading edge facing partially toward the equatorial plane, an outside leading edge facing partially toward the respective shoulder from which the lug extends, and a nose edge joining the inside leading edge and the outside leading edge; and a nose wall extending upward from the tread floor to the nose edge, the nose wall having a leading root portion having a nose ridge extending upward from the tread floor to at least one-half the tread height, the nose ridge having a radius of curvature of no greater than ½ inch, the nose ridge extending at a nose angle of from about 20° to about 60° to a radial plane.

(2) The tire of clause 1, wherein:

the nose edge is a straight nose edge; and the nose wall includes first and second nose wall sides extending upward from the tread floor and joined at the nose ridge.

(3) The tire of any preceding clause, wherein:

the nose ridge extends all the way to an intermediate point of the straight nose edge.

(4) The tire of any preceding clause, wherein:

the intermediate point of the straight nose edge is a mid-point of the straight nose edge.

(5) The tire of any preceding clause, wherein:

the nose ridge terminates between one-half and three-quarters of the lug height and then the nose wall sides blend together into an upper nose surface with no discernible nose ridge, the upper nose surface extending to the straight nose edge.

(6) The tire of any preceding clause, wherein:

the straight nose edge extends substantially parallel to a rotational axis of the tire.

(7) The tire of any preceding clause, wherein:

the nose edge is a curved nose edge, having a radius of curvature of no greater than one-half inch.

(8) The tire of any preceding clause, wherein:

the radius of curvature of the curved nose edge is no greater than 0.3 inch.

(9) The tire of any preceding clause, wherein:
the nose ridge extends all the way to the curved nose edge.

(10) The tire of any preceding clause, wherein:
the nose angle is in a range of from about 30° to about 50°.

(11) The tire of any preceding clause, wherein:
the nose angle is in a range of from about 35° to about 45°.

(12) The tire of any preceding clause, wherein:
the nose ridge extends substantially perpendicular to, but not radially from, the rotational axis of the tire.

(13) The tire of any preceding clause, wherein:
each lug extends substantially to but does not cross the equatorial plane of the tire.

(14) The tire of any preceding clause, wherein:
an axially inner end of the radially outer surface of each lug is defined by an inside lateral edge extending in a substantially circumferential direction.

(15) A pneumatic agricultural tire, comprising:
a circumferential tread portion including first and second rows of tread lugs extending from first and second shoulders of the tread portion toward an equatorial plane of the tire, the tread lugs extending upward from a tread floor by a lug height;
the lugs extending at an angle to a rotational axis of the tire to define a rotational direction of the tire such that when the tire is rolling in a forward direction an axially inner end of each lug engages the ground before an axially outer end of the lug engages the ground;
each lug having a radially outer ground engaging surface defined between a leading edge of the lug and a trailing edge of the lug;
the leading edge of each lug including an inside leading edge facing partially toward the equatorial plane, and an outside leading edge facing partially toward the respective shoulder from which the lug extends; and
each lug having a leading wall rising up from the tread floor to the leading edge, the leading wall including a wedge shaped leading nose rising up from the tread floor and sloped in the trailing direction, so that ground stubble is engaged by and pushed aside by the wedge shaped leading nose thereby reducing stubble damage at a root of the leading wall.

(16) The tire of clause 15, wherein:
the wedge shaped leading nose has a discernible nose ridge from adjacent the tread floor to at least one-half of the lug height.

(17) The tire of clause 15 or 16, wherein:
the discernible nose ridge extends all the way to the leading edge of the lug.

(18) The tire of any of clauses 15-17, wherein:
the leading edge includes a curved nose edge joining the inside leading edge and the outside leading edge.

(19) The tire of any of clauses 15-18, wherein:
the leading edge includes a straight nose edge joining the inside leading edge and the outside leading edge.

(20) The tire of any of clauses 15-19, wherein:
the discernible nose ridge has a radius of curvature of no greater than ½ inch.

(21) The tire of any of clauses 15-20, wherein:
the discernible nose ridge has a radius of curvature of no greater than 0.3 inch.

(22) The tire of any of clauses 15-21, wherein:
the wedge shaped leading nose is formed by two nose wall sides rising up from the tread floor and joining at the nose ridge.

(23) The tire of any of clauses 15-22, wherein:
the leading edge includes a straight nose edge joining the inside leading edge and the outside leading edge; and
the two nose wall sides extend to at least one-half of the lug height.

(24) The tire of any of clauses 15-23, wherein:
the nose ridge terminates between one-half and three-quarters of the lug height and then the nose wall sides blend together into an upper nose surface with no discernible nose ridge, the upper nose surface extending to the straight nose edge.

(25) The tire of any of clauses 15-24, wherein:
the two nose wall sides and the discernible nose ridge extend all the way to the straight nose edge.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention.

What is claimed is:

1. A pneumatic agricultural tire, comprising:
a circumferential tread portion including first and second rows of tread lugs extending from first and second shoulders of the tread portion toward an equatorial plane of the tire, the tread lugs extending upward from a tread floor by a lug height;
the lugs extending at an angle to a rotational axis of the tire to define a rotational direction of the tire such that when the tire is rolling in a forward direction an axially inner end of each lug engages the ground before an axially outer end of the lug engages the ground;
each lug having a radially outer ground engaging surface defined between a leading edge of the lug and a trailing edge of the lug;
the leading edge of each lug including an inside leading edge facing partially toward the equatorial plane, an outside leading edge facing partially toward the respective shoulder from which the lug extends, and a straight nose edge joining the inside leading edge and the outside leading edge; and
a nose wall extending upward from the tread floor to the nose edge, the nose wall having a leading root portion having a nose ridge extending upward from the tread floor to at least one-half the lug height, the nose ridge having a radius of curvature of no greater than ½ inch, the nose ridge extending at a nose angle of from about 20° to about 60° to a radial plane, the nose wall including first and second nose wall sides extending upward from the tread floor and joined at the nose ridge.

2. The tire of claim 1, wherein:
the nose ridge extends all the way to an intermediate point of the straight nose edge.

3. The tire of claim 2, wherein:
the intermediate point of the straight nose edge is a mid-point of the straight nose edge.

4. The tire of claim 1, wherein:
the nose ridge terminates between one-half and three-quarters of the lug height and then the nose wall sides blend together into an upper nose surface with no discernible nose ridge, the upper nose surface extending to the straight nose edge.

5. The tire of claim 1, wherein:
the straight nose edge extends substantially parallel to a rotational axis of the tire.

6. The tire of claim 1, wherein:
the nose angle is in a range of from about 40° to about 50°.

7. The tire of claim 1, wherein:
the nose angle is in a range of from about 35° to about 45°.
8. The tire of claim 1, wherein:
the nose ridge extends substantially perpendicular to, but not radially from, the rotational axis of the tire.
9. The tire of claim 1, wherein:
each lug extends substantially to but does not cross the equatorial plane of the tire.
10. The tire of claim 1, wherein:
an axially inner end of the radially outer surface of each lug is defined by an inside lateral edge extending in a substantially circumferential direction.
11. A pneumatic agricultural tire, comprising:
a circumferential tread portion including first and second rows of tread lugs extending from first and second shoulders of the tread portion toward an equatorial plane of the tire, the tread lugs extending upward from a tread floor by a lug height;
the lugs extending at an angle to a rotational axis of the tire to define a rotational direction of the tire such that when the tire is rolling in a forward direction an axially inner end of each lug engages the ground before an axially outer end of the lug engages the ground;
each lug having a radially outer ground engaging surface defined between a leading edge of the lug and a trailing edge of the lug;
the leading edge of each lug including an inside leading edge facing partially toward the equatorial plane, an outside leading edge facing partially toward the respective shoulder from which the lug extends, and a straight nose edge joining the inside leading edge and the outside leading edge; and
each lug having a leading wall rising up from the tread floor to the leading edge, the leading wall including a wedge shaped leading nose rising up from the tread floor and sloped in the trailing direction, the wedge shaped leading nose including a discernible nose ridge from adjacent the tread floor to at least one-half of the lug height, the nose ridge extending toward an intermediate point of the straight nose edge, so that ground stubble is engaged by and pushed aside by the wedge shaped leading nose thereby reducing stubble damage at a root of the leading wall.
12. The tire of claim 11, wherein:
the discernible nose ridge extends all the way to the leading edge of the lug.
13. The tire of claim 11, wherein:
the discernible nose ridge has a radius of curvature of no greater than ½ inch.
14. The tire of claim 11, wherein:
the discernible nose ridge has a radius of curvature of no greater than 0.3 inch.
15. The tire of claim 11, wherein:
the wedge shaped leading nose is formed by two nose wall sides rising up from the tread floor and joining at the nose ridge.
16. The tire of claim 15, wherein:
the two nose wall sides extend to at least one-half of the lug height.
17. The tire of claim 16, wherein:
the nose ridge terminates between one-half and three-quarters of the lug height and then the nose wall sides blend together into an upper nose surface with no discernible nose ridge, the upper nose surface extending to the straight nose edge.
18. The tire of claim 16, wherein:
the two nose wall sides and the discernible nose ridge extend all the way to the straight nose edge.
19. The tire of claim 11, wherein:
the nose ridge extends all the way to the intermediate point of the straight nose edge.
20. The tire of claim 11, wherein:
the intermediate point of the straight nose edge is a mid-point of the straight nose edge.

\* \* \* \* \*